United States Patent [19]
Lehtinen

[11] Patent Number: 5,961,055
[45] Date of Patent: Oct. 5, 1999

[54] METHOD FOR UPGRADING IRON ORE UTILIZING MULTIPLE MAGNETIC SEPARATORS

[75] Inventor: Larry J. Lehtinen, Auburn, Ind.

[73] Assignee: Iron Dynamics, Inc., Butler, Ind.

[21] Appl. No.: 08/964,978

[22] Filed: Nov. 5, 1997

[51] Int. Cl.⁶ .................................................. B02C 23/08
[52] U.S. Cl. .................................. 241/24.14; 241/24.15; 241/27
[58] Field of Search ............................ 241/24.13, 24.14, 241/24.15, 27, 29

[56] References Cited

U.S. PATENT DOCUMENTS

| | | |
|---|---|---|
| 832,823 | 10/1906 | Wait . |
| 1,576,690 | 3/1926 | Ullrich . |
| 1,866,781 | 7/1932 | Ullrich . |
| 3,022,956 | 2/1962 | Haseman ............................ 241/24.14 |
| 3,045,822 | 7/1962 | Cavanagh ............................ 209/219 |
| 3,086,718 | 4/1963 | Lukas, Jr. ............................ 241/24 |
| 3,502,271 | 3/1970 | Hays ............................ 241/20 |
| 3,625,354 | 12/1971 | Heltmann ............................ 209/3 |
| 3,672,579 | 6/1972 | Lawver ............................ 241/24.14 |
| 4,051,023 | 9/1977 | Fogle et al. . |
| 4,166,789 | 9/1979 | Imai et al. . |
| 4,206,878 | 6/1980 | Forciea ............................ 241/20 |
| 4,370,225 | 1/1983 | Bingel et al. . |
| 4,512,879 | 4/1985 | Attia et al. ............................ 209/3 |
| 4,543,178 | 9/1985 | Goldstein ............................ 209/2 |
| 5,127,586 | 7/1992 | Oder ............................ 241/24 |
| 5,636,748 | 6/1997 | Arvidson ............................ 209/223.2 |

Primary Examiner—John M. Husar
Attorney, Agent, or Firm—Woodard, Emhardt, Naughton, Moriarty & McNett

[57] ABSTRACT

The present invention relates to upgrading iron ore to decrease the amount of nonferrous materials therein, and to thereby increase the iron content thereof. More particularly, the invention relates to a process utilizing magnetic fields to separate a significant amount of non-magnetic material, such as silica or pyrolusite, from valuable iron oxide in an iron ore or iron ore concentrate. The invention therefore finds advantageous use to provide an improved source of iron oxides for high purity uses such as, for example, direct reduction processes and heavy media coal beneficiation processes.

71 Claims, 10 Drawing Sheets

METHOD FOR UPGRADING IRON ORE UTILIZING MULTIPLE MAGNETIC SEPARATORS

BACKGROUND OF THE INVENTION

1. Field of the Invention

The present invention relates to upgrading iron ore to decrease the amount of nonferrous materials therein, and to thereby increase the iron content thereof. More particularly, the invention relates to a process utilizing magnetic fields to separate a significant amount of non-magnetic material, such as silica or pyrolusite, from valuable iron oxide in an iron ore material. The invention therefore provides an improved source of iron oxides for high purity uses such as, for example, in direct reduction processes or heavy media coal beneficiation.

2. Discussion of Related Art

Treatment of ores in general to concentrate their valuable constituents (minerals) into products (concentrate) of smaller bulk, and simultaneously to collect gangue into discardable waste (tailings) is referred to as "ore dressing." The fundamental operations of ore dressing processes are the breaking apart of the associated constituents of the ore by mechanical means (severance) and the separation of the severed components (beneficiation) into concentrate and tailing, using mechanical or physical methods which do not effect substantial chemical changes in the ores. Beneficiation therefore consists of two fundamental operations: the determination that an individual particle is either a mineral or a gangue particle (selection); and the movement of selected particles via different paths (separation) into the concentrate and tailing products. Selection is based upon some physical or chemical property in which the mineral and gangue particles differ in kind or degree or both.

Known beneficiation techniques include, for example, flotation, gravity settling, electrostatic separation, or other special processes. Further, the use of magnetic separators to remove ferromagnetic minerals is generally known. Examples of processes and devices for magnetic separation include, among many others, those disclosed in U.S. Pat. No. 3,045,822 to Cavanagh, U.S. Pat. No. 5,636,748 to Arvidson, U.S. Pat. No. 4,512,879 to Attia et al., U.S. Pat. No. 4,307,225 to Bingel et al., U.S. Pat. No. 4,166,789 to Imai et al., U.S. Pat. No. 4,051,023 to Fogle and U.S. Pat. No. 3,502,271 to Hays. These patents are incorporated herein by reference in their entirety. However, to date methods of beneficiating iron ore by removing therefrom non-magnetic material (such as, for example, silica and pyrolusite) have not produced ore concentrates having satisfactory purity.

Turning now to a particular use of high purity iron ore concentrate, iron ores of varying purity are reduced to elemental iron using a wide variety of methods as a step in steel-making processes. Historically, reduction has been achieved in a blast furnace by heating the reactants to extremely high temperatures, thereby producing molten products of elemental iron and contaminants. The contaminants, or "slag," are then separated from the molten iron to yield a purified "pig iron" product. However, blast furnace processes are problematic because a they require huge capital investment, a new installation estimated to cost in the hundreds of millions of dollars. Major reline/rebuild projects are also required approximately every 8–10 years, these projects commonly costing from about 50 million to about 100 million dollars. Furthermore, conventional blast furnace processes also require production of coke as a starting material, and significant investment is required in a coke-producing installation to satisfy environmental standards in the United States.

A reduction method currently receiving a great deal of attention, due in part to the significantly lower capital costs associated therewith, is direct reduction of iron. Direct reduction is a type of reduction process in which the reduction reaction is achieved without melting the reactants. Skilled artisans in the field of refining iron are increasingly recognizing direct reduction as a useful method of converting iron ore into elemental iron. The two general categories of direct reduction are (1) those that utilize a gas such as, for example, natural gas as the reducing agent, and (2) those that utilize solid carbonaceous materials such as coal as the reducing agent (solids-based direct iron reduction). While solids-based direct iron reduction is presently being given a great deal of attention as a potentially useful reduction mechanism, gas-based processes are much more prevalent commercially. Processes which utilize natural gas as the reductant typically involve expensive oxide pellets or lump ore as feed stock. It is believed that the only solids based direct reduced iron currently being produced in any significant amount involves the use of oxide pellets or lump ore together with sized coal as the feed material. Irrespective of whether a gas-based or solids-based process is used, however, there is a great need for iron ore starting materials having significantly reduced gangue content.

In direct reduction, the starting materials are heated to a temperature below the melting point of the starting materials, but high enough to elicit reduction of iron oxides therein to yield "sponge iron." The term "sponge iron" refers to the product of a direct reduction process and is used interchangeably herein with the terms "direct reduced iron" and "DRI". The sponge iron then may be densified by briquetting or melted to further reduce iron oxide and extract the reduced elemental iron from contaminants such as silica, alumina and sulfur, which arc tightly bound to the elemental iron in the sponge iron product.

One significant problem encountered in direct reduction processes, is that a large input of resources is required to remove the contaminants from the elemental iron after direct reduction. In this regard, many iron ore starting materials available on the market, such as specular hematite concentrate, have a silica content of up to about 6% by weight. To produce a DRI product having an acceptable silica content, the ore used as the starting material in a direct reduction process should be no greater than about 3%, more preferably no greater than about 2%. Therefore, much effort has been expended developing improved processes for upgrading iron ores efficiently and on a large scale to increase the iron content, and decrease the silica content thereof.

Pyrolusite ($MnO_2$) is another contaminant present in a number of iron ores available in the marketplace, and it is highly desirable to remove pyrolusite from an ore when it is present. For example, Wabush Mines, a company which mines specular hematite in the northeastern region of Canada known as the "Labrador Trough," offers for sale specular hematite (in the form of fines or as pellets) which has a manganese content of from about 1% to about 2% by weight, the manganese being primarily in the form of pyrolusite. Pyrolusite is a harmful contaminant in a feedstock for reduction and/or steel-making processes because it is resistant to reduction and manganese oxides are highly corrosive to refractories present in, for example, melting or smelting furnaces. Therefore, there is also a need for a process which removes pyrolusite from an iron ore. As the demand for DRI increases in North America and worldwide, the need for iron ore concentrates having significantly lower silica and manganese content also increases. Therefore, there is a need in the art for improved methods of upgrading iron ore and iron ore concentrates to achieve satisfactory levels of purity.

The present invention addresses the above-mentioned problems by teaching a process for upgrading iron ore having therein a nonmagnetic contaminant such as silica and/or pyrolusite to produce an ore having excellent purity for use, for example, in direct reduction processes or in heavy media coal beneficiation. By utilizing inventive methods, a high purity iron ore concentrate is provided which may be reduced, for example, by direct reduction, to thereby produce a DRI product which has a reduced amount of contaminants therein, this advantageously reducing the capital and operating costs associated with steel-making processes.

SUMMARY OF THE INVENTION

To overcome problems in the prior art relating to the difficulty of removing gangue from an iron ore, the present invention provides methods for removing nonmagnetic contaminants, such as silica and/or pyrolusite, from an iron ore or an iron ore concentrate to provide a purified iron ore concentrate having a silica content of less than about 3%.

In accordance with a preferred aspect of the invention, there is provided a method for upgrading iron ore, comprising (1) providing a substantially dry feed stream of iron ore having therein one or more nonmagnetic contaminants; (2) passing the iron ore through a low intensity magnetic field to thereby separate the ore into a first magnetic fraction and a first nonmagnetic fraction; and (3) passing the first nonmagnetic fraction through a high intensity magnetic field to thereby separate the first nonmagnetic fraction into a second magnetic fraction and a second nonmagnetic fraction. In preferred aspects of the invention, the feed stream and/or the second nonmagnetic fraction is size classified to provide one or more oversize fractions and one or more undersize fractions. In an alternate preferred aspect of the invention, the second magnetic fraction is subjected to a "cleaner" step by passing it through a high intensity magnetic field to produce a third magnetic fraction and a third nonmagnetic fraction. The third nonmagnetic fraction may also preferably be size classified to recover an oversize fraction therefrom.

It is an object of the present invention to provide a process for upgrading an iron ore having nonmagnetic contaminants therein to provide a purified iron ore concentrate finding advantageous use in high purity applications, such as, for example, as an improved starting material for direct iron reduction processes or as a heavy media product for use in, for example, heavy media coal beneficiation.

It is another object of the invention to provide a process for reducing the manganese content of an iron ore concentrate so that the product can be advantageously used in reducing, melting or smelting furnaces such as blast furnaces, rotary kilns, rotary hearth furnaces and the like without damage to refractory materials in the subsequent steel refining process steps.

It is also an object of the invention to provide a cost effective process for upgrading iron ore for use in direct iron reduction processes which reduces downstream processing costs by decreasing the amount of gangue which must be handled, fluxed, melted, separated and disposed of in subsequent downstream iron and steel refining process steps.

Further objects, advantages and features of the present invention will be apparent from the drawings and detailed description herein.

BRIEF DESCRIPTION OF THE DRAWINGS

Although the characteristic features of this invention will be particularly pointed out in the claims, the invention itself, and the manner in which it may be made and used, may be better understood by referring to the following descriptions taken in connection with the accompanying drawings forming a part hereof.

DESCRIPTION OF THE PREFERRED EMBODIMENTS

Figure 1:
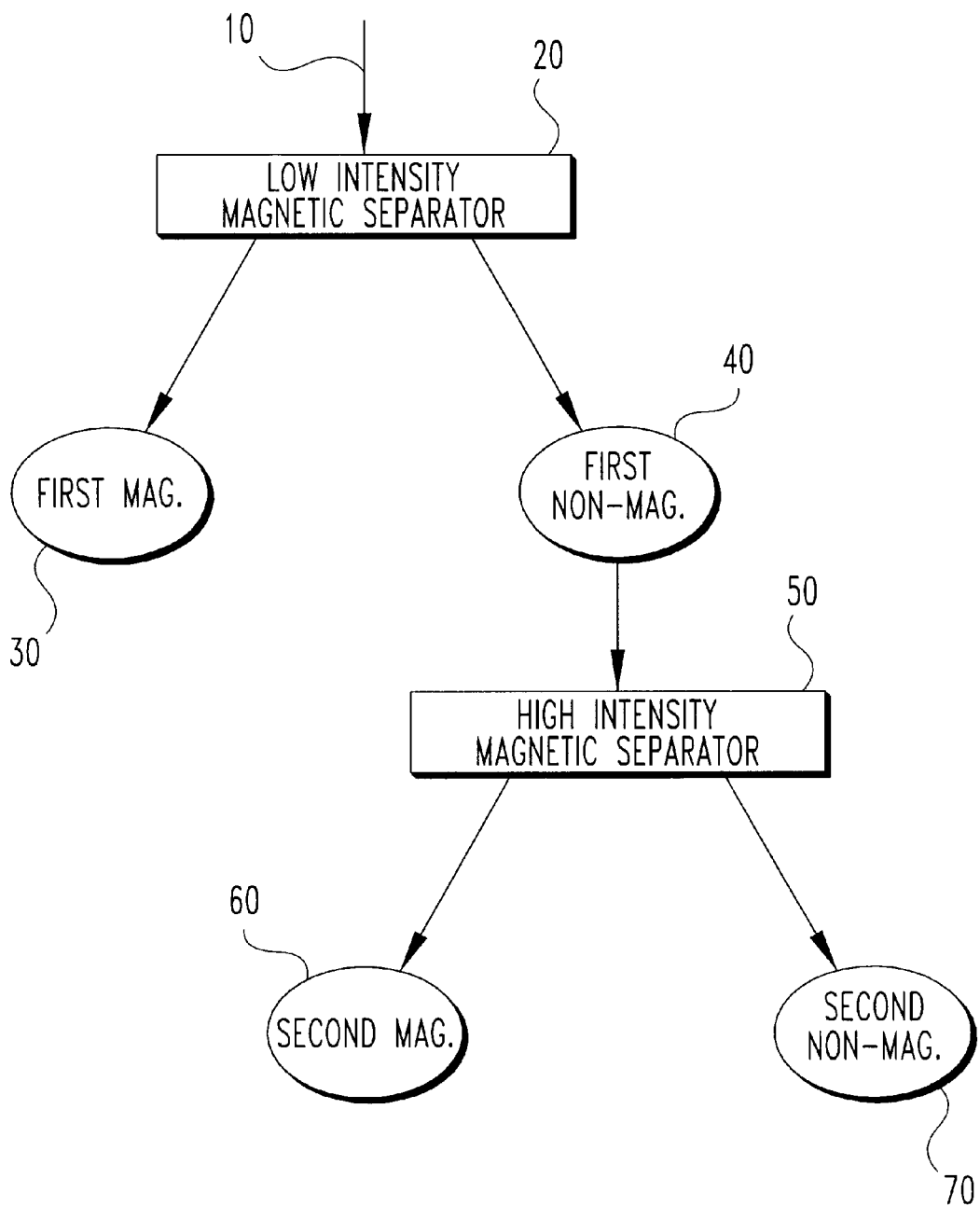
FIG. 1 is a flow diagram showing schematically an inventive process.

For the purposes of promoting an understanding of the principles of the invention, reference will now be made to specific embodiments illustrated in the drawings and specific language will be used to describe the same. It will nevertheless be understood that no limitation of the scope of the invention is thereby intended, such alterations and further modifications in the illustrated methods, and such further applications of the principles of the invention as illustrated therein being contemplated as would normally occur to one skilled in the art to which the invention pertains.

The present invention provides methods for the removal of nonmagnetic contaminants, such as silica and/or manganese minerals such as pyrolusite, from an iron ore or iron ore concentrate, such as specular hematite or a concentrate thereof, to provide an ore concentrate having a silica and manganese content of less than about 3% by weight. Thus, methods of the invention decrease, for example, the silica and/or manganese content of an iron ore concentrate to a satisfactory level for use in high purity applications. Applications in which a high purity product of the invention finds advantageous use include iron reduction processes using, for example, direct reduction furnaces and blast furnaces. Products of inventive processes also find advantageous use in other high purity applications, such as, for example, as heavy media reagents for coal beneficiation.

Inventive processes may be effectively and efficiently practiced on a large scale, and processing capacity may be increased by simply increasing in parallel the size or number of separators described herein. Additionally, inventive processes produce a purified product with only minimal iron loss (i.e., iron recovery of at least about 95%). A purified iron ore product is produced using magnetic fields and, preferably, screening, and has excellent purity with respect to, for example, silica and pyrolusite. Use of a purified ore concentrate produced in accordance with the invention in a direct reduction process, enables the production of DRI having a lesser amount of contaminants therein, thereby significantly lowering the capital and operating costs associated with the handling, fluxing, melting, separating and disposal of such contaminants in subsequent iron and steel refining process steps.

Magnetic separation utilizes the force exerted by a magnetic field upon magnetic materials to counteract partially or wholly the effects of gravity and inertia. Thus, in a magnetic separation, under the action of these forces, different trajectories are produced for magnetic and nonmagnetic particles, resulting in a wide range of trajectories for particles having varying densities and magnetic properties. Inclusion of a particle in or exclusion of a particle from a given fraction is achieved by placing a splitter at some point along the spectrum of particle trajectories. Separations may be made in accordance with the invention using a wide variety of magnetic separator designs, however, a preferred embodiment utilizes one or more dry magnetic drum separators, and such an embodiment will be described in greater detail herein. It is to be understood that alternative designs may be utilized in accordance with inventive principles, however, and such alternate designs are expressly encompassed by the invention.

A typical magnetic drum separator is constructed to have a drum formed as a cylindrical shell which is rotatably journaled onto a horizontal axis. Particulate material is introduced on the outer cylindrical surface of the drum and, as the drum rotates, this particulate material is advanced and is discharged under the force of gravity so as to have a discharge trajectory. A magnetic array is disposed internally of and separate from the drum and is located proximate to the drum sidewall and positioned to interact with the particulate material before it is discharged from the drum surface. Thus, as the particulate material moves past the magnetic array, due to magnetic attraction between the magnetic array and particles having magnetic properties, magnetic components of the particulate material tend to adhere to the drum surface longer than non-magnetic components. Moreover, different magnetic components of the material have varying strengths of interaction with the magnetic field from the magnet array so that the differing magnetic components as well as nonmagnetic components have different discharge trajectories from the drum due to a combination of the magnetic force and the gravitational and inertial forces. The different streams of particulate materials may be separated by simple partition walls, or by an adjustable splitter, into chutes, bins or the like.

When the chief mineral being separated is magnetite, iron ores can be cheaply and effectively separated by low-intensity separators. In accordance with a preferred aspect of the invention, depicted schematically in FIG. 1, strongly magnetic materials are recovered from a flow stream 10, preferably using a dry low intensity magnetic separator 20 such as, for example, a drum separator. Once strongly magnetic materials such as magnetite and maghemite are recovered from the feed stream 10 into the first magnetic fraction 30, the remaining materials (i.e., the first nonmagnetic fraction 40) are subjected to high intensity separation using a high intensity magnetic separator 50. The high intensity magnetic separation removes weakly magnetic materials, thereby providing a second magnetic fraction 60 and a second nonmagnetic fraction 70. In a preferred aspect of the invention, wherein the original feed stream 10 comprises a specular hematite concentrate, the second nonmagnetic fraction 70 comprises a substantial amount (i.e., up to about 75% by weight) of the nonmagnetic contaminants (e.g., the silica and/or pyrolusite) present in the feed material 10.

It is preferred that the iron ore feed stream 10 be substantially dry, the term "substantially dry" being used to designate that the ore has a moisture content of less than about 1.0%, more preferably less than about 0.5%. High-intensity separators used in accordance with the invention for the separation of weakly magnetic minerals are believed to have suitable separating effect only on substantially dry materials because surface tension effects of a wet material interfere with separation. Since the ores or concentrates fed to the inventive process normally will have been subjected to conventional wet beneficiation techniques, such materials will need to be dewatered and dried before being processed in accordance with the invention.

Advantageous starting materials selected for upgrading in accordance with the invention are concentrates composed principally of specular hematite which include lesser amounts of magnetite, silica and pyrolusite. It is desirable to upgrade conventional specular hematite concentrates because when it is used, for example, as a starting material for direct reduction, the silica and pyrolusite content therein should be decreased to no greater than about 3% by weight. Therefore, there is a great need for improved processes for efficiently, quickly and cheaply upgrading an ore by decreasing, for example, the silica and/or pyrolusite content of specular hematite concentrates, thereby increasing the iron content. Suitable iron ore concentrates advantageously upgraded in accordance with the invention are concentrates produced from ores in the "Labrador Trough," this term being used to refer generally to an iron formation in the northeastern region of Canada, e.g., in Quebec, Labrador and New Foundland. Such concentrates may be obtained from Quebec Cartier Mining Company ("QCM"), Iron Ore Company of Canada ("IOCC") and Wabush Mines ("Wabush"). Concentrates presently available from these companies typically have a silica concentration of between about 3% and about 6% by weight. While this is a suitable concentration for use of the ore in a blast furnace, a silica concentration of about 2% or less is needed for advantageous use of the ore in a direct reduction process. Additionally, ores mined by Wabush Mines typically have a high manganese content (i.e., up to about 2.5%). Inventive processes are advantageously used to decrease manganese (e.g., pyrolusite) content of an ore as well as silica content. It is readily understood that ores other than those explicitly set forth above may be advantageously upgraded in accordance with the invention, the main criterion being that nonmagnetic materials are present which are desired to be separated from magnetic materials.

The best results are achieved in accordance with the invention when the material being upgraded is relatively closely sized. A rare earth magnetic separator is used as the high intensity separator 50, 140 in a preferred inventive process to provide a high intensity magnetic field. Rare earth magnetic separation is particularly sensitive to particle size. It is preferred that an ore to be upgraded using an inventive process have a maximum particle size of no greater than about 5 mm, more preferably no greater than about 3 mm, more preferably no greater than about 2 mm and most preferably no greater than about 1 mm. It is understood that the particles should also not be so fine that the material being upgraded has a powder-like consistency, because upgrading in accordance with the invention is difficult to achieve when the particles are too finely ground. Therefore, it is also preferred that at least about 90% of the ore particles are greater than about 50 microns, more preferably at least about 90% of the ore particles are greater than about 63 microns. Additionally, it is preferred that the average particle size in a feed stream be from about 100 microns to about 5 mm, more preferably from about 100 microns to about 3 mm, more preferably from about 100 microns to about 2 mm and most preferably from about 100 microns to about 1 mm.

Figure 3:
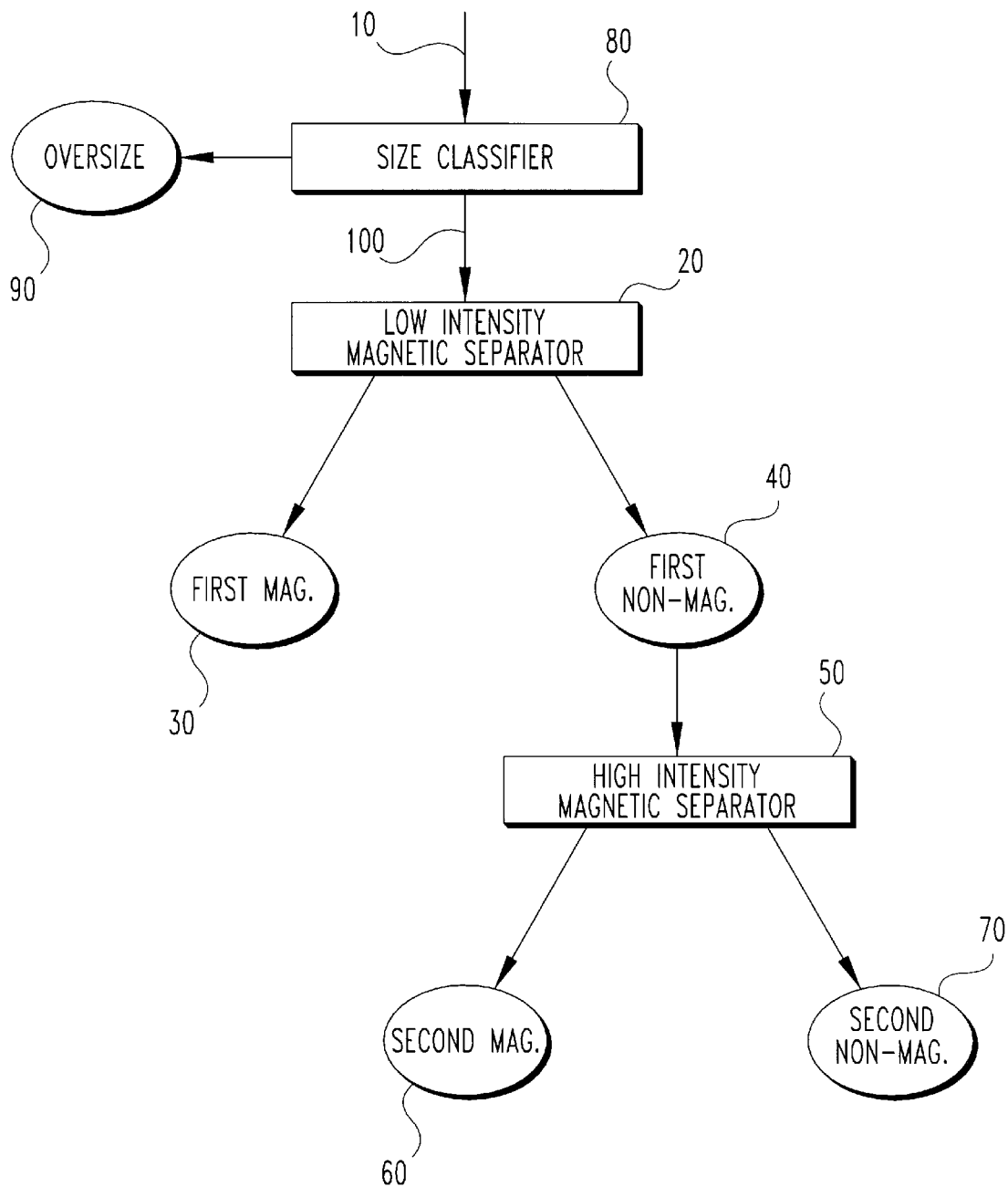
FIG. 3 is a flow diagram showing schematically the process depicted in FIG. 1, wherein the feed stream is size classified to provide an oversize fraction and an undersize fraction.

In one preferred aspect of the invention, depicted schematically in FIG. 3, a flow stream 10 is passed through a size classifier 80 where it is subjected to a size separation (i.e., screened or air classified) at a size split of from about 10 mesh to about 150 mesh. Screening and air classifying may be accomplished using techniques known in the art. More preferably, the flow stream is separated at a size split of from about 20 to about 80 mesh and most preferably from about 40 to about 60 mesh. This separation yields an oversize fraction 90 and an undersize fraction 100. The undersize fraction 100 is then passed over the low intensity magnetic separator 20 as described above, and the oversize fraction 90 may preferably be combined with other save materials to provide a high purity iron ore concentrate or may be subjected to further comminution and reintroduced into the flow stream 10.

In view of the above preferences relating to particle size of the material being upgraded using inventive processes, it is understood that the present invention is particularly useful to upgrade an iron ore concentrate that has previously been beneficiated, for example, using conventional techniques. For example, the invention finds advantageous use in upgrading iron ore concentrates currently on the market which are acceptable for reduction by conventional blast furnace processes. In such an application, the iron ore concentrate used as an inventive starting material will commonly already meet the above particle size preferences. In other applications, however, it may be necessary to grind or pulverize an ore or ore concentrate, and it may be preferred to subject the ground or pulverized product to size separation and comminution techniques known in the art as set forth herein.

Figure 2:
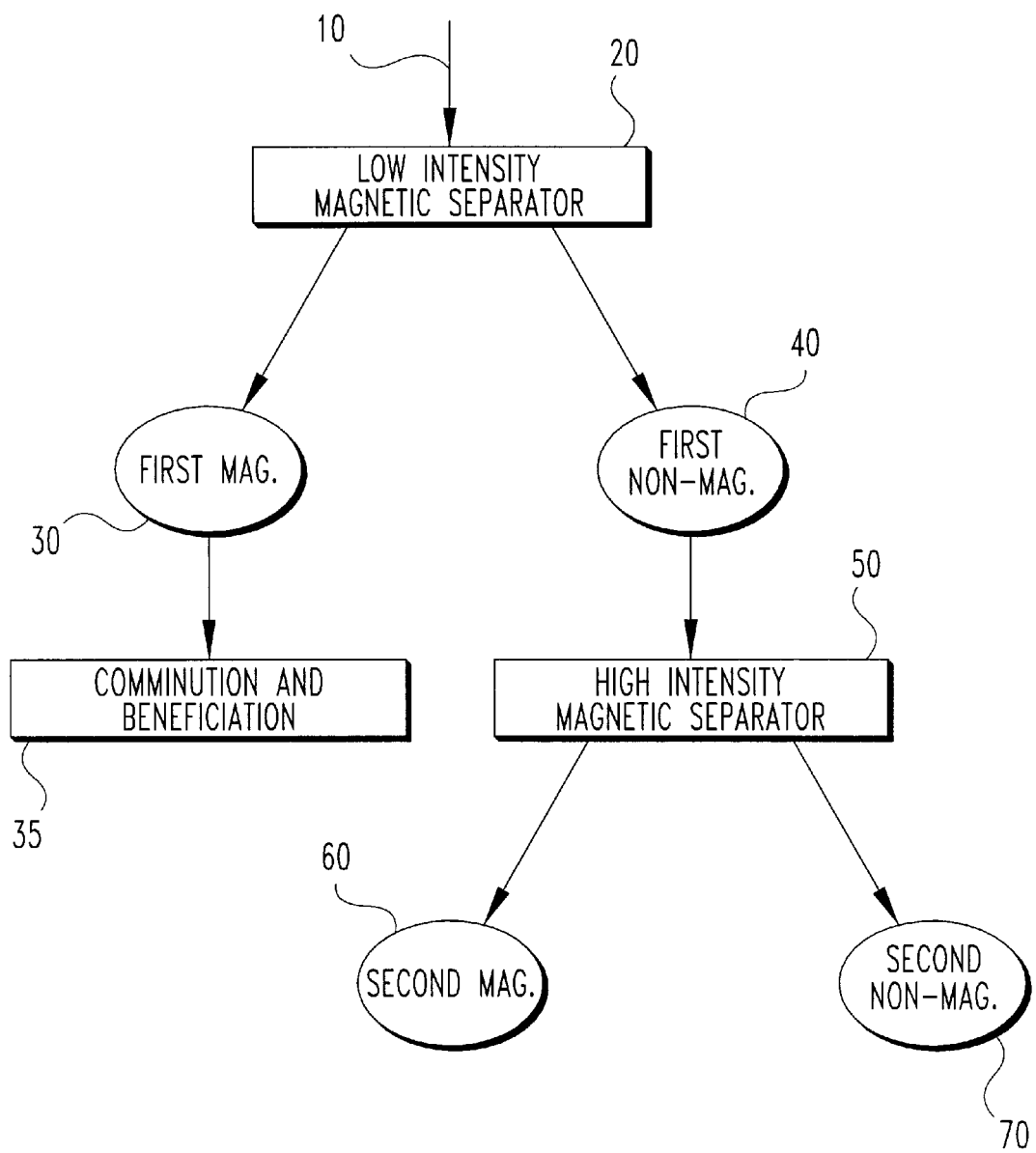
FIG. 2 is a flow diagram showing schematically the process depicted in FIG. 1, wherein the first magnetic fraction is subjected to conventional comminution and beneficiation.

An iron ore is upgraded in accordance with the invention by providing a substantially dry feed stream 10 of iron ore, such as from an ore dryer, the iron ore having therein a nonmagnetic contaminant. The feed stream 10 is preferably conveyed on a conventional conveyor belt. The ore is then passed over a low intensity magnetic separator 20, such as a drum separator, to thereby separate the ore into a first magnetic fraction 30 and a first nonmagnetic fraction 40. A drum magnetic separator advantageously used may be obtained from a supplier such as Eriez Magnetics (Erie, Pa.) or International Process Systems, Inc. (Lakewood, Colo.). The low intensity magnetic field preferably has a field strength of from about 500 to about 2000 gauss. The field strength is more preferably from about 500 to about 1500 gauss, more preferably from about 800 to about 1200 gauss and most preferably about 1000 gauss As is readily understood by a skilled artisan, the first magnetic fraction 30 includes materials having relatively strong magnetic characteristics, such as magnetite and maghemite. The term "first magnetic fraction" is therefore used herein to designate a fraction comprising such materials having relatively strong magnetic characteristics. The term "first nonmagnetic fraction" is used to designate a fraction comprising materials whose trajectory off the drum is not substantially effected by the low intensity magnetic field. In one preferred aspect of the invention, the first magnetic fraction 30 is further comminuted and beneficiated using conventional techniques, such processing being depicted schematically in FIG. 2 by reference numeral 35.

It is to be understood that magnetic materials may reside in the first nonmagnetic fraction 40; however, where the ratio of magnetism to weight in a given particle is not sufficiently high, the particle will come to reside in the first nonmagnetic fraction 40. It is preferred that substantially no strongly magnetic materials remain in the first nonmagnetic fraction 40, because such particles may interfere with subsequent processing. The first nonmagnetic fraction 40 also includes nonmagnetic materials, such as silica and/or pyrolusite, which are desired to be removed from the iron ore starting material to increase the purity thereof.

To recover weakly magnetic material from the first nonmagnetic fraction 40, the first nonmagnetic fraction 40 is then passed through a high intensity magnetic separator 50 to thereby separate the first nonmagnetic fraction 40 into a second magnetic fraction 60 and a second nonmagnetic fraction 70. The high intensity magnetic separator 50 preferably has a field strength of from about 4000 to about 30,000 gauss. The field strength is more preferably from about 5000 to about 15,000 gauss, more preferably from about 6000 to about 10,000 gauss and most preferably about 7000 gauss. As with low intensity separation, a wide variety of separators may advantageously be used; however, a magnetic drum separator is preferably used. Magnets used in accordance with the invention are preferably of the permanent type, rare earth permanent magnets being preferred due to lower maintenance required and generally simpler design and operation.

The second magnetic fraction 60 includes particles having relatively weak magnetic characteristics, such as specular hematite and middling particles having both non-magnetic material such as silica and/or pyrolusite and enough magnetic material to be deflected by the high intensity field. The term "second magnetic fraction" is therefore used herein to designate a fraction comprising such materials having relatively weak magnetic characteristics. The term "second nonmagnetic fraction" is used to designate a fraction comprising materials not deflected sufficiently by the high intensity magnet to end up in the magnetic fraction.

Figure 4:
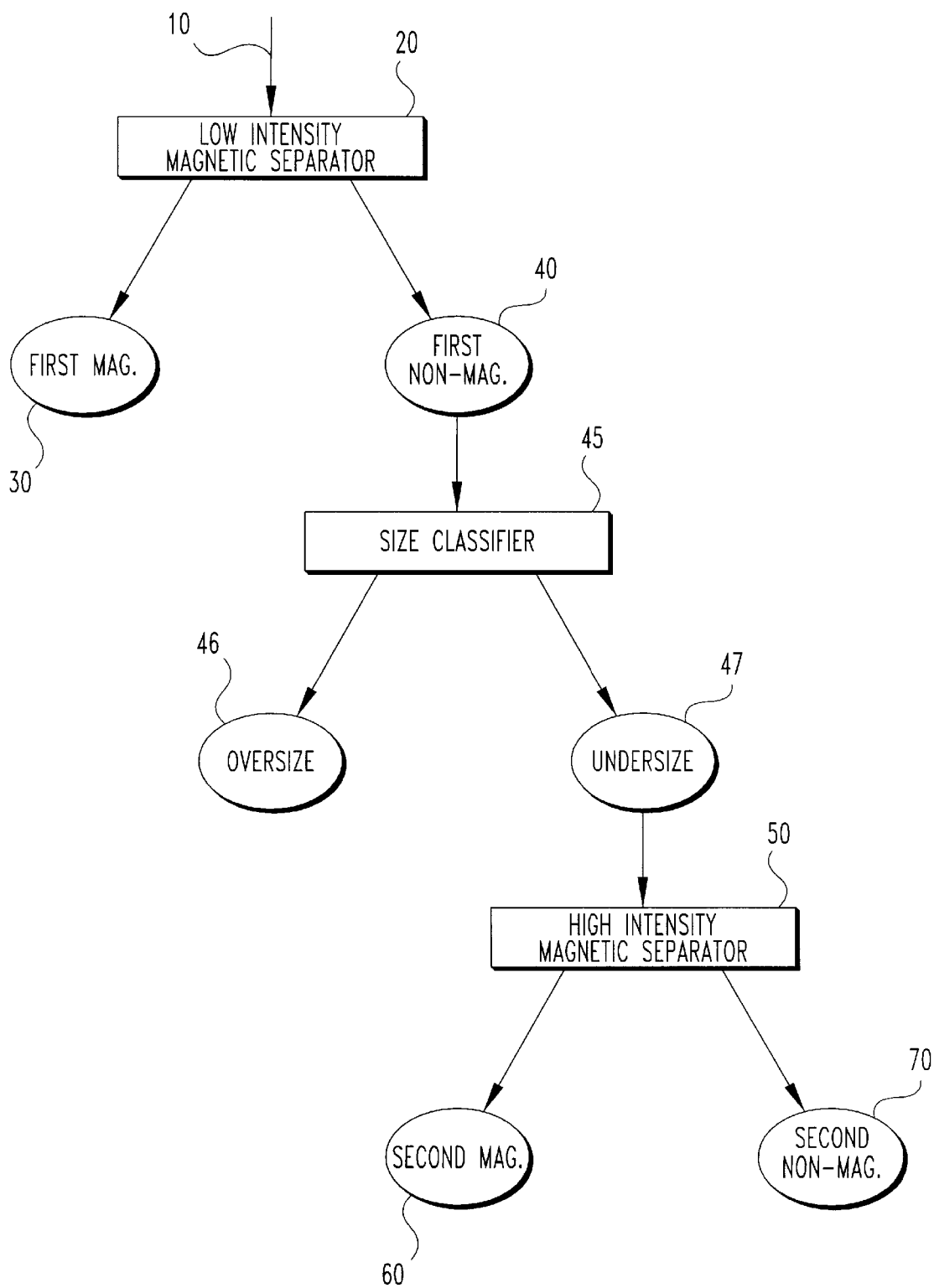
FIG. 4 is a flow diagram showing schematically an inventive process wherein the first nonmagnetic fraction is size classified to provide an oversize fraction and an undersize fraction, the undersize fraction being passed through the high intensity separator.
Figure 5:
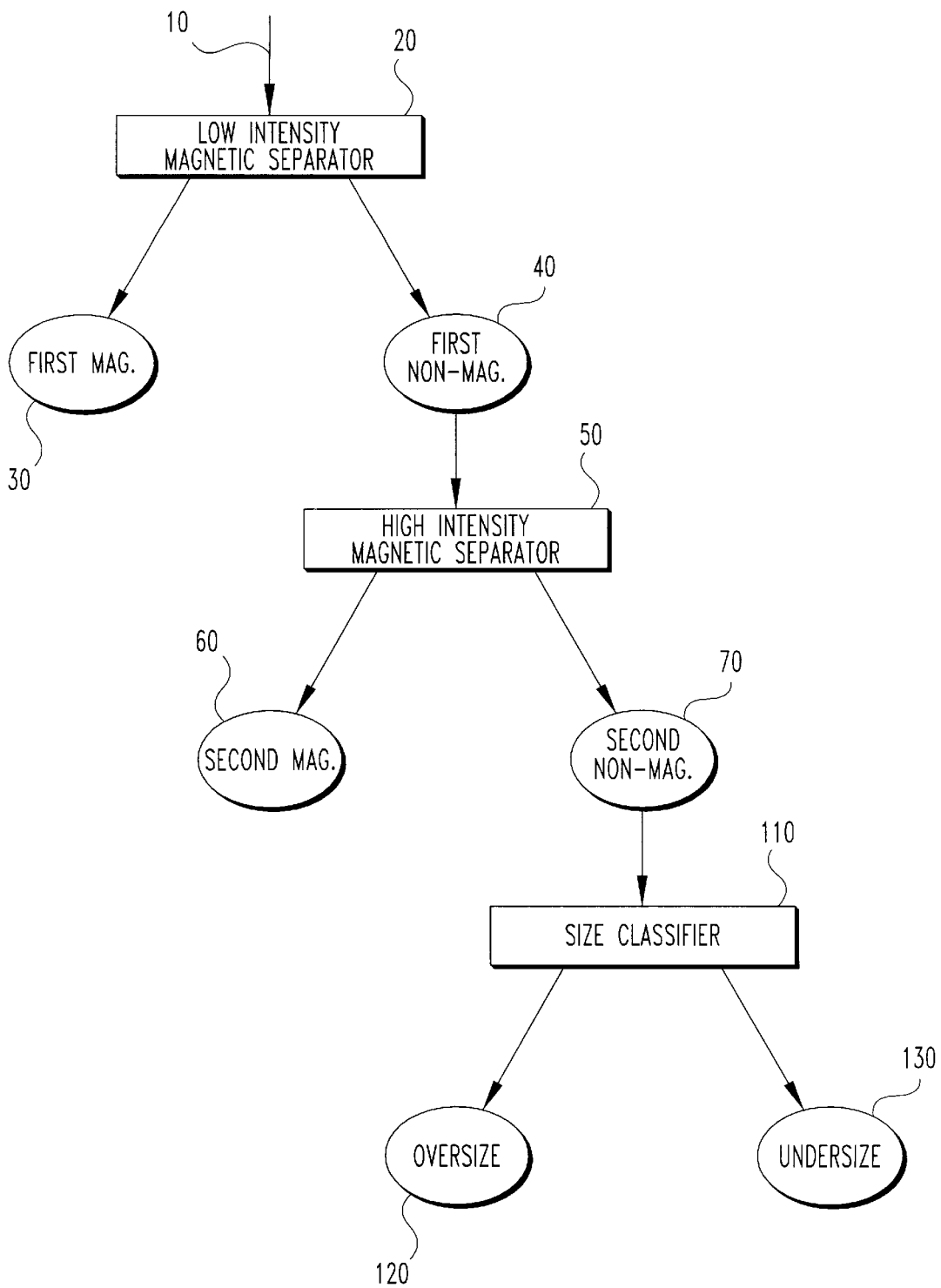
FIG. 5 is a flow diagram showing schematically the process depicted in FIG. 1, wherein the second nonmagnetic fraction is size classified to provide an oversize fraction and an undersize fraction.

It is common, however, that some magnetic materials remain in the second nonmagnetic fraction 70. A common reason for this is that large, relatively pure hematite particles may have too much inertia to be deflected into the magnetic fraction during high intensity magnetic separation, and become misplaced in the second nonmagnetic fraction 70. Therefore, to recover iron values, size classification (i.e., screening or air classifying) may be performed either before high intensity separation, as depicted schematically in FIG. 4, or after high intensity separation, as depicted in FIG. 5. In the former, the first nonmagnetic fraction 40 is passed through a size classifier 45, to thereby provide an oversize fraction 46 and an undersize fraction 47. When a size classifier 45 is positioned as shown in FIG. 4, the undersize fraction 47 is then passed through a high intensity magnetic separator 50 to provide a second magnetic fraction 60 and a second nonmagnetic fraction 70.

Alternatively, when size classification is performed after high intensity separation, as depicted in FIG. 5, the second nonmagnetic fraction 70 is passed through a size classifier 110 to provide an oversize fraction 120 and an undersize fraction 130. The size classifiers preferably separate at a size split of from about 10 mesh to about 150 mesh, more preferably of about 20 to about 80 mesh and most preferably of about 40 to about 60 mesh. Size separation is preferably performed at one or the other of the described stages to recover large magnetic particles, such as hematite particles, which often become misplaced in the high intensity separation.

The oversize fraction 46 or the oversize fraction 120 may then be combined with the first magnetic fraction 30 and the second magnetic fraction 60 to provide a purified iron ore product, or may be ground for further liberation and introduced into the iron ore feed stream or into the first nonmagnetic fraction 40 to further recover iron ore therefrom. The second nonmagnetic fraction 70 in the process set forth schematically in FIG. 4 or the undersize fraction 130 in the process set forth schematically in FIG. 5 comprises a substantial portion of the nonmagnetic material, such as, for example, the silica and pyrolusite, present in the iron ore starting material. For example, it is expected that at least about 50% and more preferably about at least about 60% of the silica present in the iron ore starting material ultimately resides in the nonmagnetic fraction 70 of FIG. 4 or the undersize fraction 130 of FIG. 5. These fractions preferably have an iron content of less than about 35% by weight, and more preferably less than about 18% by weight. These fractions may be discarded or sold as is or after further refinement as a byproduct silica sand to be used, for example, in sand blasting applications or other conventional silica sand applications.

Figure 6:
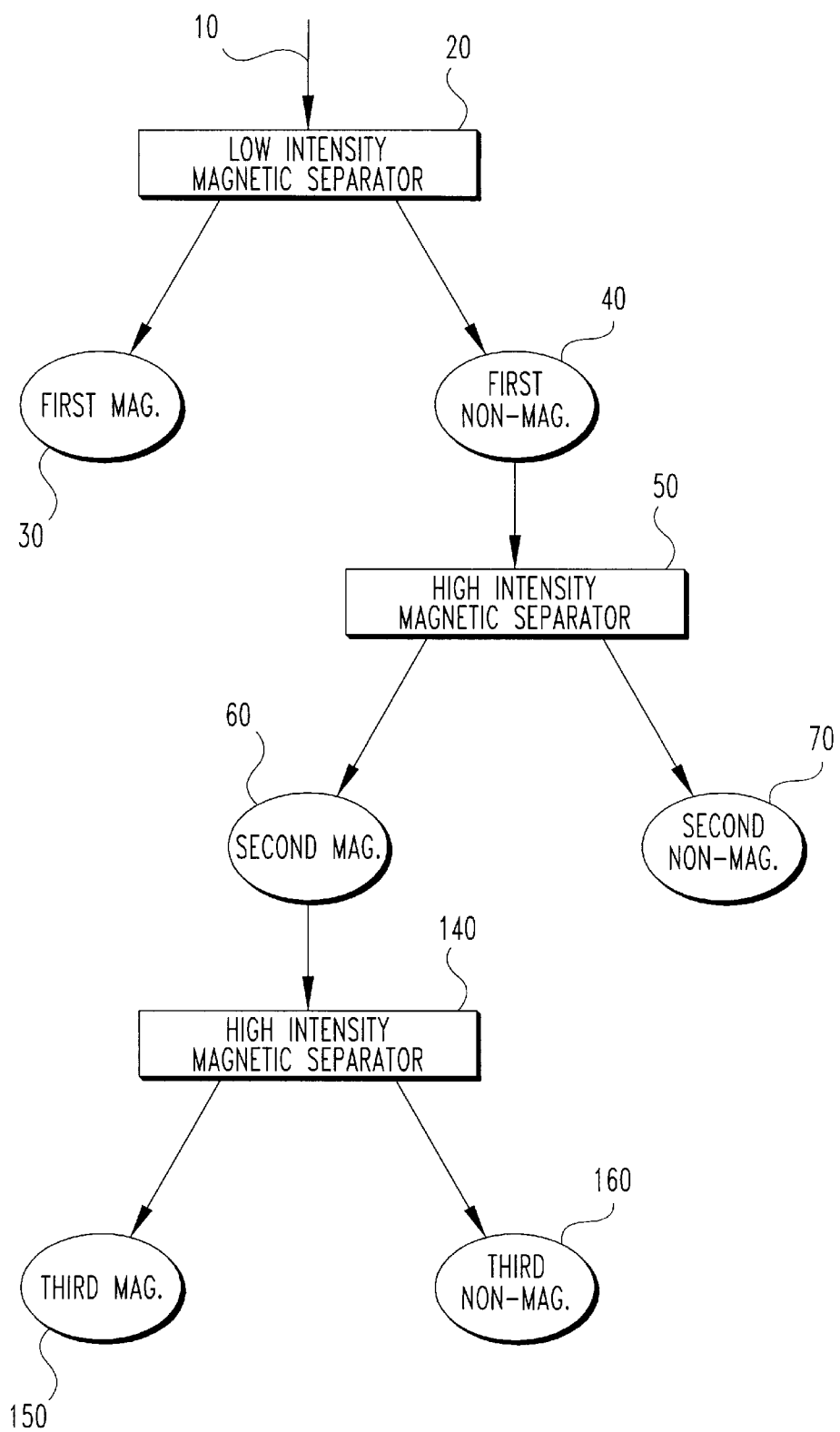
FIG. 6 is a flow diagram showing schematically the process depicted in FIG. 1, wherein the second magnetic fraction is passed through a second high intensity magnetic separator to "clean" the second magnetic fraction, thereby providing a third magnetic fraction and a third nonmagnetic fraction.
Figure 7:
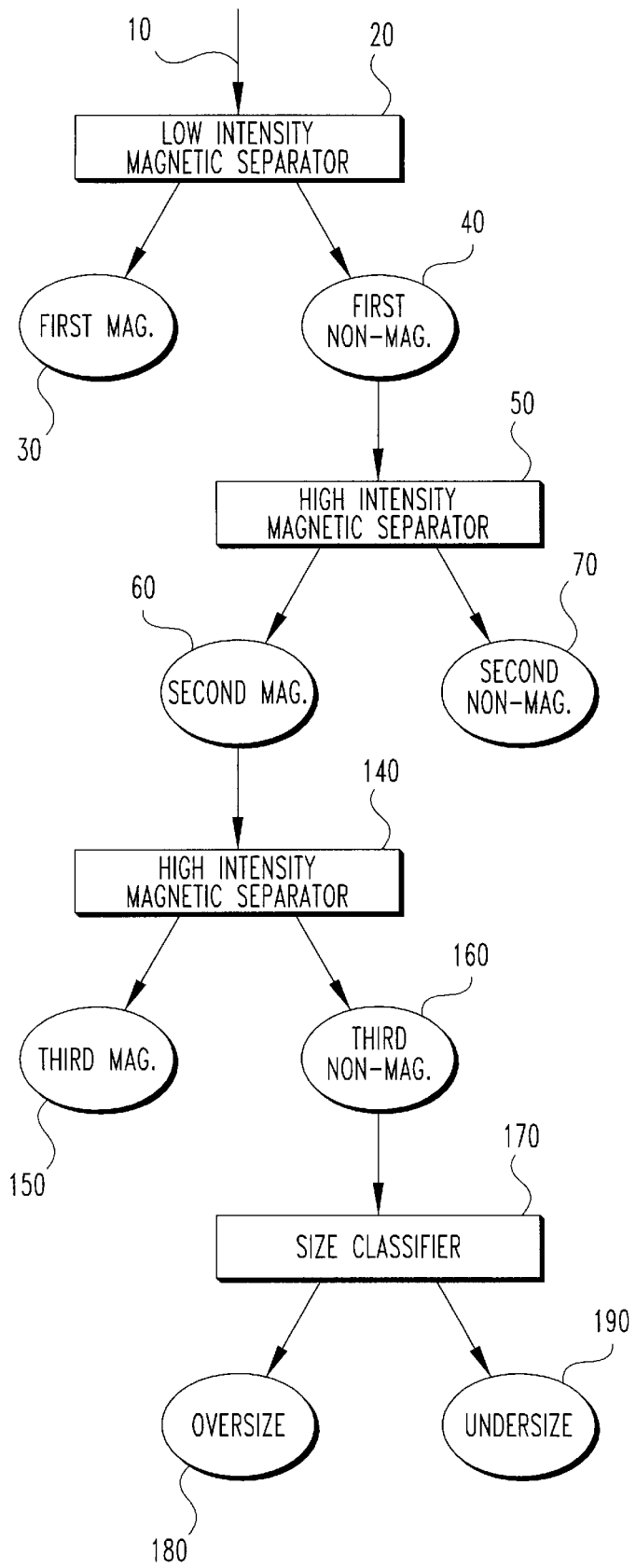
FIG. 7 is a flow diagram showing schematically the process depicted in FIG. 6, wherein the third nonmagnetic fraction is size classified to provide an oversize fraction and an undersize fraction.
Figure 8:
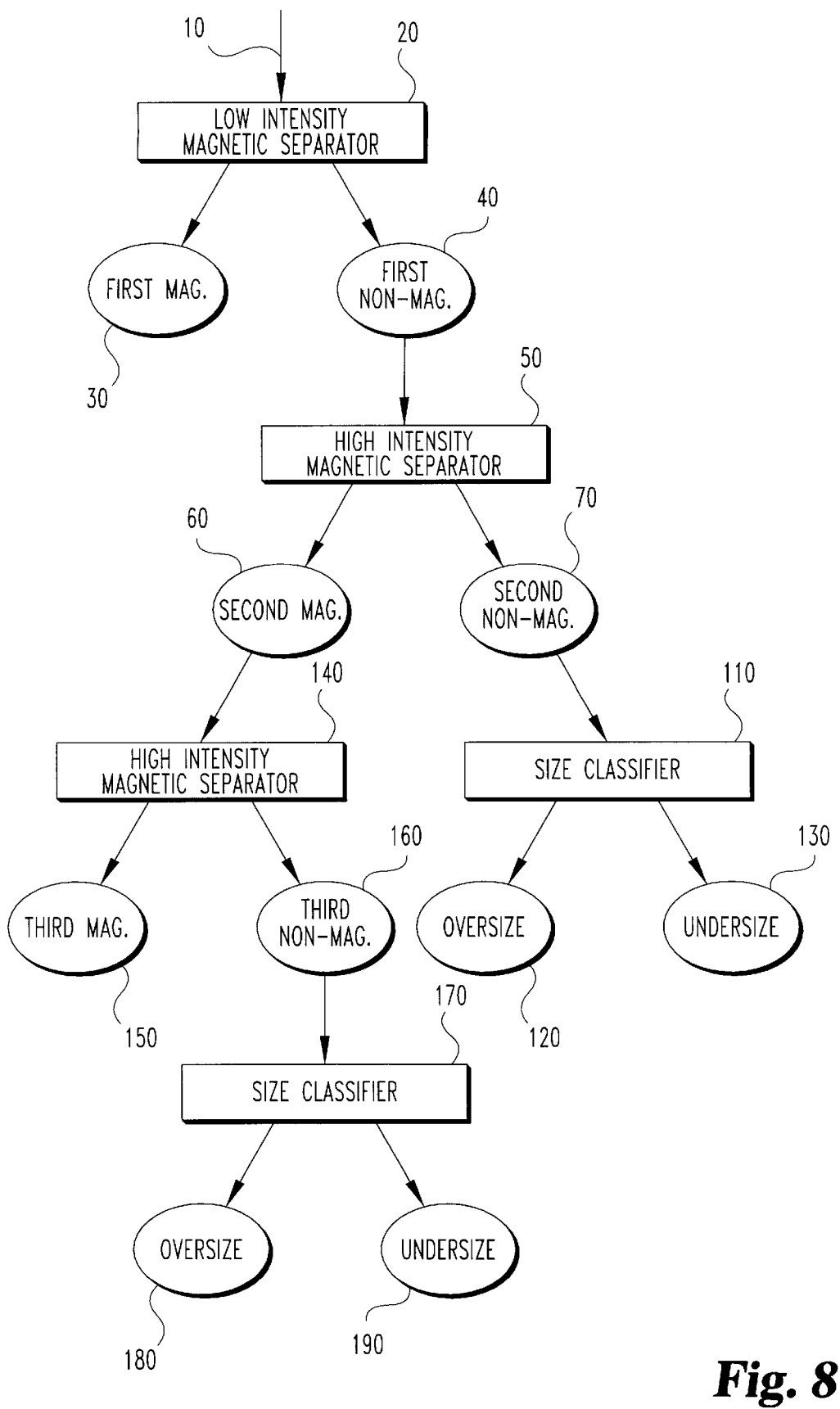
FIG. 8 is a flow diagram showing schematically the process depicted in FIG. 6, wherein the second nonmagnetic fraction and the third nonmagnetic fraction are size classified to provide two oversize fractions and two undersize fractions.
Figure 9:
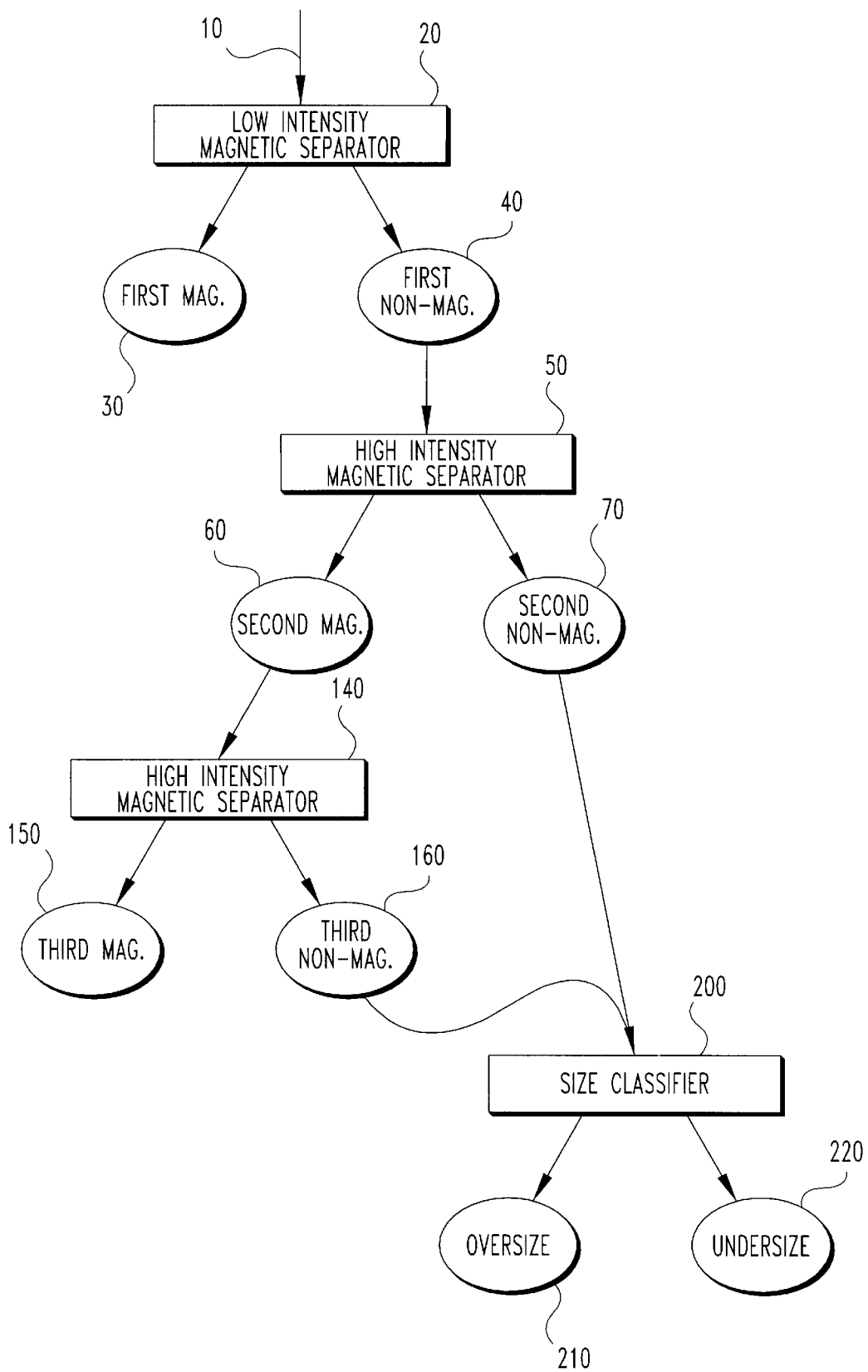
FIG. 9 is a flow diagram showing schematically the process depicted in FIG. 6, wherein the second nonmagnetic fraction and the third nonmagnetic fraction are combined and then passed through a size classifier to provide an oversize fraction and an undersize fraction.

In certain preferred aspects of the invention, the second magnetic fraction 60 is subjected to one or more additional "cleaner" separations by passing it through one or more high intensity separators. Therefore, in one aspect of the invention, the second magnetic fraction 60 is passed through a second high intensity magnetic separator 140, as depicted schematically in FIG. 6, to provide a third magnetic fraction 150 and a third non-magnetic fraction 160, thereby further increasing the purity of the product. The third non-magnetic fraction 160 may advantageously be combined with the second non-magnetic fraction 70 for size classification, as depicted in FIG. 9, to provide an oversize fraction 210 and an undersize fraction 220, so that the oversize materials therein can be saved as described above. Alternatively, the third nonmagnetic fraction 160 may be passed through a separate size classifier 170, as depicted in FIG. 8, where it is separated into an oversize fraction 180 and an undersize fraction 190.

Figure 10:
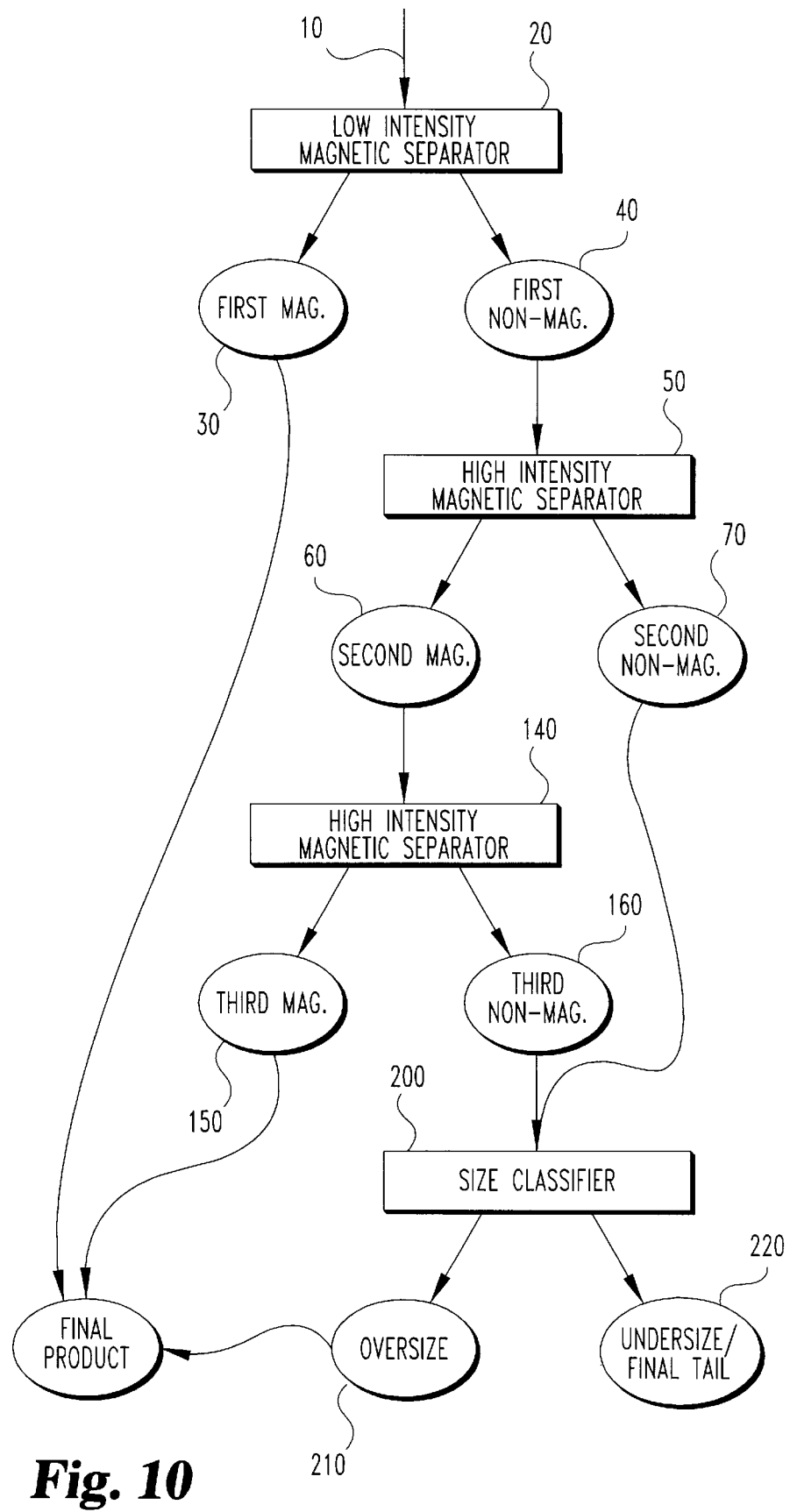
FIG. 10 is a flow diagram showing schematically the process depicted in FIG. 9, wherein the first magnetic fraction, the third magnetic fraction and the oversize fraction are combined to provide a final product.

The first and third magnetic fractions 30, 150 (or first and second magnetic fractions 30, 60 where no "cleaner" separation is performed), plus one or more oversize fractions (if size separation but not regrinding is performed) are then excellent starting materials for subsequent reduction into elemental, or metallic, iron or for other high purity uses. These fractions may advantageously be combined to provide a purified iron ore concentrate, an example of which is shown schematically in FIG. 10, or may alternatively be used separately or placed onto the market separately.

A combined product of the magnetic and oversize fractions has therein a substantially reduced silica, pyrolusite and/or other nonmagnetic material content. For example, where the starting material is a specular hematite concentrate having a silica content of about 4.0 to about 5.0% by weight, a combined product may be produced which has a silica content of less than about 2.5%. Furthermore, this advantageous result is achieved with an iron recovery of greater than about 98% by weight. The product is therefore an excellent starting material for direct reduction processes.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. The invention will be further described with reference to the following specific Examples. It will be understood that these Examples are also illustrative and not restrictive in nature.

EXAMPLE ONE

A dry iron ore material having nonmagnetic materials therein is subjected to low intensity dry magnetic separation by being passed over a dry low intensity drum-type magnetic separator with a magnetic field strength of about 1000 gauss. The low intensity magnetic separation yields a first magnetic save material fraction comprising magnetite and/or other strongly magnetic materials, and a first nonmagnetic material fraction. The first nonmagnetic material fraction is then subjected to high intensity magnetic separation by passing this fraction over a dry rare earth high intensity magnetic separator having a field strength of about 7000 gauss. This separates specularite, misplaced magnetite and/or other weakly magnetic materials from non-magnetics including silica, middlings, pyrolusite and misplaced oversize specular hematite particles.

EXAMPLE TWO

A dry iron ore material is processed as described in Example 1, with the additional provision that, before being subjected to low intensity separation, the dry ore is size classified using a screen system or air classifier. Alternatively, a moist iron ore is dried and size classified simultaneously using a drier/classifier combination. The size classification system used generally makes a size split at from about 20 to about 80 mesh, preferably from about 40 to about 60 mesh to provide an oversize fraction and an undersize fraction.

The undersize fraction is then processed as described in Example 1. The oversize fraction is recombined with the low silica fractions produced by subsequent high intensity separation and screening or is ground and processed as described in Example 1.

EXAMPLE THREE

A dry iron ore material is processed as described in Example 1, with the additional provision that the first nonmagnetic fraction is size classified using a screen system or air classifier. The size classification system used generally makes a size split at from about 20 to about 80 mesh, preferably from about 40 to about 60 mesh to provide an oversize fraction and an undersize fraction.

The undersize fraction is then passed through a high intensity separator as described in Example 1. The oversize fraction is recombined with the low silica fractions, or is ground and processed as described in Example 1.

EXAMPLE FOUR

A dry iron ore material is processed as described in Example 1, with the additional provision that the second nonmagnetic fraction is size classified using a screen system or air classifier. The size classification system used generally makes a size split at from about 20 to about 80 mesh, preferably from about 40 to about 60 mesh to provide an oversize fraction and an undersize fraction.

The undersize fraction is then discarded or prepared for sale, for example, as a silica sand byproduct. The oversize fraction is recombined with the low silica fractions, or is ground and processed as described in Example 1.

EXAMPLE FIVE

The first and second magnetic fractions, as described in Example 1 and, optionally, the oversize fractions described in Examples 2, 3 and 4 are combined to provide a purified iron ore concentrate having an increased iron content and a decreased amount of nonmagnetic materials therein. The purified iron ore concentrate is an excellent iron oxide starting material for a reduction reaction such as, for example, direct reduction on a rotary hearth furnace, or gas based shaft reduction furnace.

EXAMPLE SIX finely divided iron ore containing principally specular hematite together with lesser quantities of one or more of the following minerals: magnetite, maghemite, pyrolusite, silica, and various other trace minerals is thermally dried. Next, the iron ore concentrate is screened or air classified at a nominal size split ranging from about 150 mesh up to about 10 mesh, depending upon the size consist of the concentrate and the relative amounts of the various iron or manganese minerals in the particular concentrate to be treated.

The undersize product is fed to a set of low intensity dry magnetic separators having magnetic susceptibilities of from about 100 gauss to about 2000 gauss, preferably about 1000 gauss, to separate the magnetic materials (i.e. magnetite and maghemite) from the nonmagnetic material (i.e., specularite, pyrolusite and silica). The nonmagnetic flowstream is fed to a set of high intensity dry magnetic separators employing rare earth permanent magnets with magnetic susceptibilities of from about 5000 gauss to about 20,000 gauss, preferably about 7000 gauss. The nonmagnetic flowstream from the high intensity magnetic separators is then screened or air classified at a size split that can range (depending on the size consist and degree of liberation of the iron, manganese and silica minerals) from about 150 mesh up to as coarse as about 10 mesh with the normal split at about 50 mesh.

Depending upon the silica content of each of the saved flowstreams (i.e., feed oversize, low intensity magnetic materials, high intensity magnetic materials and reject oversize) one or more of the saved flowstreams may be reground using a high pressure roll press or a dry ball mill followed by additional low intensity and/or high intensity dry magnetic separation to liberate silica from the desired mineral and achieve further upgrading with respect to iron. The upgraded flowstreams, which include all streams except the nonmagnetic undersize of the high intensity rare earth dry magnetic separator, are recombined to form the final upgraded, low silica iron ore concentrate. Optionally, the feed oversize and/or the oversize of the rare earth nonmagnetic flowstream may be separately ground if the final product use desires a smaller top size to the final product size distribution. The reject product of the process can be potentially sold as a by product silica sand product.

EXAMPLE SEVEN

Dry specular hematite comprising about 66% iron by weight and about 4.5% silicon dioxide ($SiO_2$) by weight is subjected to low intensity dry magnetic separation by being passed through a magnetic separator having a field intensity of about 1000 gauss. The low intensity magnetic separation yields a first magnetic save material fraction comprising magnetite and/or other strongly magnetic materials, and a first nonmagnetic material fraction. The first magnetic fraction comprises about 5.0% by weight of the feed material and about 3.0% by weight $SiO_2$.

The first nonmagnetic material fraction (about 95% of the feed material) is then subjected to high intensity magnetic separation by passing this fraction through a dry rare earth high intensity magnetic separator having a field strength of about 7000 gauss. This separation removes specularite and/or other weakly magnetic materials placing these materials in a second magnetic fraction. Also recovered is a second nonmagnetic fraction. The second magnetic fraction comprises about 85% of the original specular hematite feed material, and comprises about 1.44% $SiO_2$. The second nonmagnetic fraction comprises about 10.4% by weight of the original specular hematite feed material and comprises about 27.9% $SiO_2$.

EXAMPLE EIGHT

Dry specular hematite is processed as described in Example 6, with the additional provision that, before being subjected to low intensity separation, the specular hematite is size classified using a screen system or air classifier. Alternatively, a moist specular hematite is dried and size classified simultaneously using a drier/classifier combination. The size classification system used generally makes a size split at from about 20 to about 80 mesh, preferably from about 40 to about 60 mesh to provide an oversize fraction and an undersize fraction.

The undersize fraction is then processed as described in Example 6. The oversize fraction is saved as a final product for subsequent use in a high purity application, or is ground to a size distribution that liberates waste materials and then recycled to the dry iron ore to be processed as described in Example 6.

EXAMPLE NINE

Dry specular hematite concentrate is processed as described in Example 6, with the additional provision that the second nonmagnetic fraction is size classified using a screen system or air classifier. The size classification system used generally makes a size split at from about 20 to about 80 mesh, preferably from about 40 to about 60 mesh to provide an oversize fraction and an undersize fraction.

The undersize fraction is then discarded or prepared for sale, for example, as silica sand. The oversize fraction is then saved as a final product for subsequent use in high purity applications, or is ground to a size distribution that liberates waste materials and then recycled to the dry iron ore feed material to be processed as described in Example 6.

EXAMPLE TEN

The first and second magnetic fractions, as described in Example 6 and, optionally, the oversize fractions described in Examples 7 and 8 are combined to provide a purified specular hematite concentrate having an increased iron content and a decreased amount of silica and/or pyrolusite therein. The purified specular hematite concentrate is an excellent iron oxide starting material for a reduction reaction such as, for example, direct reduction in one of a wide variety of reduction furnaces.

EXAMPLE ELEVEN

A dry iron ore material is processed as described in Example 1, and the second magnetic fraction is then passed over a dry rare earth high intensity magnetic separator having a field strength of about 7000 gauss to provide a third magnetic fraction and a third nonmagnetic fraction. The third magnetic fraction may then be combined with other save materials or used or sold for high purity uses.

What is claimed is:

1. A method for upgrading iron ore, comprising:
   providing a substantially dry feed stream including a weakly magnetic particulate ore, a strongly magnetic particulate ore and one or more particulate nonmagnetic contaminants;
   passing the ore through a first magnetic field having a field strength of from about 500 to about 2000 gauss to thereby separate the ore into a first magnetic fraction and a first nonmagnetic fraction; and
   passing the first nonmagnetic fraction through a second magnetic field having a field strength of from about 4000 to about 30,000 gauss to thereby separate the first nonmagnetic fraction into a second magnetic fraction and a second nonmagnetic fraction.

2. The method according to claim 1, wherein the first magnetic field has a field strength of from about 500 to about 1500 gauss.

3. The method according to claim 1, wherein the first magnetic field has a field strength of from about 800 to about 1200 gauss.

4. The method according to claim 1, wherein the first magnetic field has a field strength of about 1000 gauss.

5. The method according to claim 1, wherein the second magnetic field has a field strength of from about 5000 to about 15,000 gauss.

6. The method according to claim 1, wherein the second magnetic field has a field strength of from about 6000 to about 10,000 gauss.

7. The method according to claim 1, wherein the second magnetic field has a field strength of about 7000 gauss.

8. The method according to claim 1, wherein the feed stream comprises particles having a maximum particle size of about 5 mm.

9. The method according to claim 1, wherein the feed stream comprises particles having a maximum particle size of about 3 mm.

10. The method according to claim 1, wherein the feed stream comprises particles having a maximum particle size of about 1 mm.

11. The method according to claim 1, wherein at least about 90% of the ore particles are greater than about 50 microns.

12. The method according to claim 1, wherein at least about 90% of the ore particles are greater than about 63 microns.

13. The method according to claim 1, wherein the feed stream comprises particles having an average particle size of from about 100 microns to about 5 mm.

14. The method according to claim 1, further comprising combining the first magnetic fraction and the second magnetic fraction to provide a purified iron ore concentrate.

15. The method according to claim 14, further comprising reducing the purified iron ore concentrate to provide elemental iron.

16. The method according to claim 1, further comprising subjecting the second nonmagnetic fraction to a size separation at a size split at from about 10 to about 150 mesh, thereby providing an oversize fraction and an undersize fraction.

17. The method according to claim 16, further comprising combining the first magnetic fraction and, the second magnetic fraction and the oversize fraction to provide a purified iron ore concentrate.

18. The method according to claim 1, further comprising passing the second magnetic fraction through a third magnetic field having a field strength of from about 4000 to about 30,000 gauss to thereby separate the second magnetic fraction into a third magnetic fraction and a third nonmagnetic fraction.

19. The method according to claim 18, further comprising subjecting the third nonmagnetic fraction to a size separation at a size split at from about 10 to about 150 mesh, thereby providing an oversize fraction and an undersize fraction.

20. The method according to claim 19, further comprising combining the first magnetic fraction, the third magnetic fraction and the oversize fraction to provide a purified iron ore concentrate.

21. The method according to claim 18, further comprising subjecting the second and third nonmagnetic fractions to a size separation at a size split at from about 10 to about 150 mesh, thereby providing an oversize fraction and an undersize fraction.

22. The method according to claim 21, further comprising combining the first magnetic fraction, the third magnetic fraction and the oversize fraction to provide a purified iron ore concentrate.

23. The method according to claim 18, further comprising combining the first magnetic fraction and the third magnetic fraction to provide a purified iron ore concentrate.

24. The method according to claim 1, further comprising comminuting the first magnetic fraction and beneficiating the first magnetic fraction.

25. The method according to claim 1, wherein the weakly magnetic ore comprises specular hematite ore.

26. The method according to claim 1, wherein the strongly magnetic ore comprises magnetite ore.

27. A method for upgrading iron ore, comprising:
   providing a substantially dry feed stream including a weakly magnetic particulate ore, a strongly magnetic particulate ore and one or more particulate nonmagnetic contaminants;
   subjecting the feed stream to a size separation at a size split of from about 10 to about 150 mesh, thereby providing a first oversize fraction and a first undersize fraction;
   passing the first undersize fraction through a first magnetic field having a field strength of from about 500 to about 2000 gauss to thereby separate the ore into a first magnetic fraction and a first nonmagnetic fraction; and passing the first nonmagnetic fraction through a second magnetic field having a field strength of from about 4000 to about 30,000 gauss to thereby separate the first nonmagnetic fraction into a second magnetic fraction and a second nonmagnetic fraction.

28. The method according to claim 27, wherein the first magnetic field has a field strength of from about 500 to about 1500 gauss.

29. The method according to claim 27, wherein the first magnetic field has a field strength of from about 800 to about 1200 gauss.

30. The method according to claim 27, wherein the first magnetic field has a field strength of about 1000 gauss.

31. The method according to claim 27, wherein the second magnetic field has a field strength of from about 5000 to about 15,000 gauss.

32. The method according to claim 27, wherein the second magnetic field has a field strength of from about 6000 to about 10,000 gauss.

33. The method according to claim 27, wherein the second magnetic field has a field strength of about 7000 gauss.

34. The method according to claim 27, wherein the feed stream comprises particles having a maximum particle size of about 5 mm.

35. The method according to claim 27, wherein the feed stream comprises particles having a maximum particle size of about 3 mm.

36. The method according to claim 27, wherein at least about 90% of the ore particles are greater than about 50 microns.

37. The method according to claim 27, wherein at least about 90% of the ore particles are greater than about 63 microns.

38. The method according to claim 27, wherein the feed stream comprises particles having an average particle size of from about 100 microns to about 5 mm.

39. The method according to claim 27, further comprising combining the first oversize fraction, the first magnetic fraction and the second magnetic fraction to provide a purified iron ore concentrate.

40. The method according to claim 39, further comprising reducing the purified iron ore concentrate to provide elemental iron.

41. The method according to claim 27, further comprising subjecting the second nonmagnetic fraction to a size separation at a size split at from about 10 to about 150 mesh, thereby providing a second oversize fraction and a second undersize fraction.

42. The method according to claim 41, further comprising combining the first magnetic fraction, the second magnetic fraction, the first oversize fraction and the second oversize fraction to provide a purified iron ore concentrate.

43. The method according to claim 27, further comprising passing the second magnetic fraction through a third magnetic field having a field strength of from about 4000 to about 30,000 gauss to thereby separate the second magnetic fraction into a third magnetic fraction and a third nonmagnetic fraction.

44. The method according to claim 43, further comprising combining the first magnetic fraction, the third magnetic fraction and the first oversize fraction to provide a purified iron ore concentrate.

45. The method according to claim 43, further comprising subjecting the third nonmagnetic fraction to a size separation at a size split at from about 10 to about 150 mesh, thereby providing a second oversize fraction and a second undersize fraction.

46. The method according to claim 45, further comprising combining the first magnetic fraction, the third magnetic fraction, the first oversize fraction and the second to provide a purified iron ore concentrate.

47. The method according to claim 43, further comprising subjecting the second and third nonmagnetic fractions to a size separation at a size split at from about 10 to about 150 mesh, thereby providing a second oversize fraction and a second undersize fraction.

48. The method according to claim 47, further comprising combining the first magnetic fraction, the third magnetic fraction, the first oversize fraction and the second oversize fraction to provide a purified iron ore concentrate.

49. The method according to claim 27, further comprising comminuting the first magnetic fraction and beneficiating the first magnetic fraction.

50. The method according to claim 27, wherein the weakly magnetic ore comprises specular hematite ore.

51. The method according to claim 27, wherein the strongly magnetic ore comprises magnetite ore.

52. A method for upgrading iron ore, comprising:
providing a substantially dry feed stream including a weakly magnetic particulate ore, a strongly magnetic particulate ore and one or more particulate nonmagnetic contaminants;
passing the ore through a first magnetic field having a field strength of from about 500 to about 2000 gauss to thereby separate the ore into a first magnetic fraction and a first nonmagnetic fraction;
subjecting the first nonmagnetic fraction to a size separation at a size split of from about 10 to about 150 mesh, thereby providing an oversize fraction and an undersize fraction; and
passing the undersize fraction through a second magnetic field having a field strength of from about 4000 to about 30,000 gauss to thereby separate the undersize fraction into a second magnetic fraction and a second nonmagnetic fraction.

53. The method according to claim 52, wherein the first magnetic field has a field strength of from about 500 to about 1500 gauss.

54. The method according to claim 52, wherein the first magnetic field has a field strength of from about 800 to about 1200 gauss.

55. The method according to claim 52, wherein the first magnetic field has a field strength of about 1000 gauss.

56. The method according to claim 52, wherein the second magnetic field has a field strength of from about 5000 to about 15,000 gauss.

57. The method according to claim 52, wherein the second magnetic field has a field strength of from about 6000 to about 10,000 gauss.

58. The method according to claim 52, wherein the second magnetic field has a field strength of about 7000 gauss.

59. The method according to claim 52, wherein the feed stream comprises particles having a maximum particle size of about 5 mm.

60. The method according to claim 52, wherein the feed stream comprises particles having a maximum particle size about 3 mm.

61. The method according to claim 52, wherein the feed stream comprises particles having a maximum particle size of about 1 mm.

62. The method according to claim 52, wherein at least about 90% of the ore particles are greater than about 50 microns.

63. The method according to claim 52, wherein at least about 90% of the ore particles are greater than about 63 microns.

64. The method according to claim 52, wherein the feed stream comprises particles having an average particle size of from about 100 microns to about 5 mm.

65. The method according to claim 52, further comprising combining the first magnetic fraction, the second magnetic fraction and the oversize fraction to provide a purified iron ore concentrate.

66. The method according to claim 65, further comprising reducing the purified iron ore concentrate to provide elemental iron.

67. The method according to claim 52, further comprising passing the second magnetic fraction through a third magnetic field having a field strength of from about 4000 to about 30,000 gauss to thereby separate the second magnetic fraction into a third magnetic fraction and a third nonmagnetic fraction.

68. The method according to claim 67, further comprising combining the first magnetic fraction, the third magnetic fraction and the oversize fraction to provide a purified iron ore concentrate.

69. The method according to claim 52, further comprising comminuting the first magnetic fraction and beneficiating the first magnetic fraction.

70. The method according to claim 52, wherein the weakly magnetic ore comprises specular hematite ore.

71. The method according to claim 52, wherein the strongly magnetic ore comprises magnetite ore.

* * * * *